UNITED STATES PATENT OFFICE.

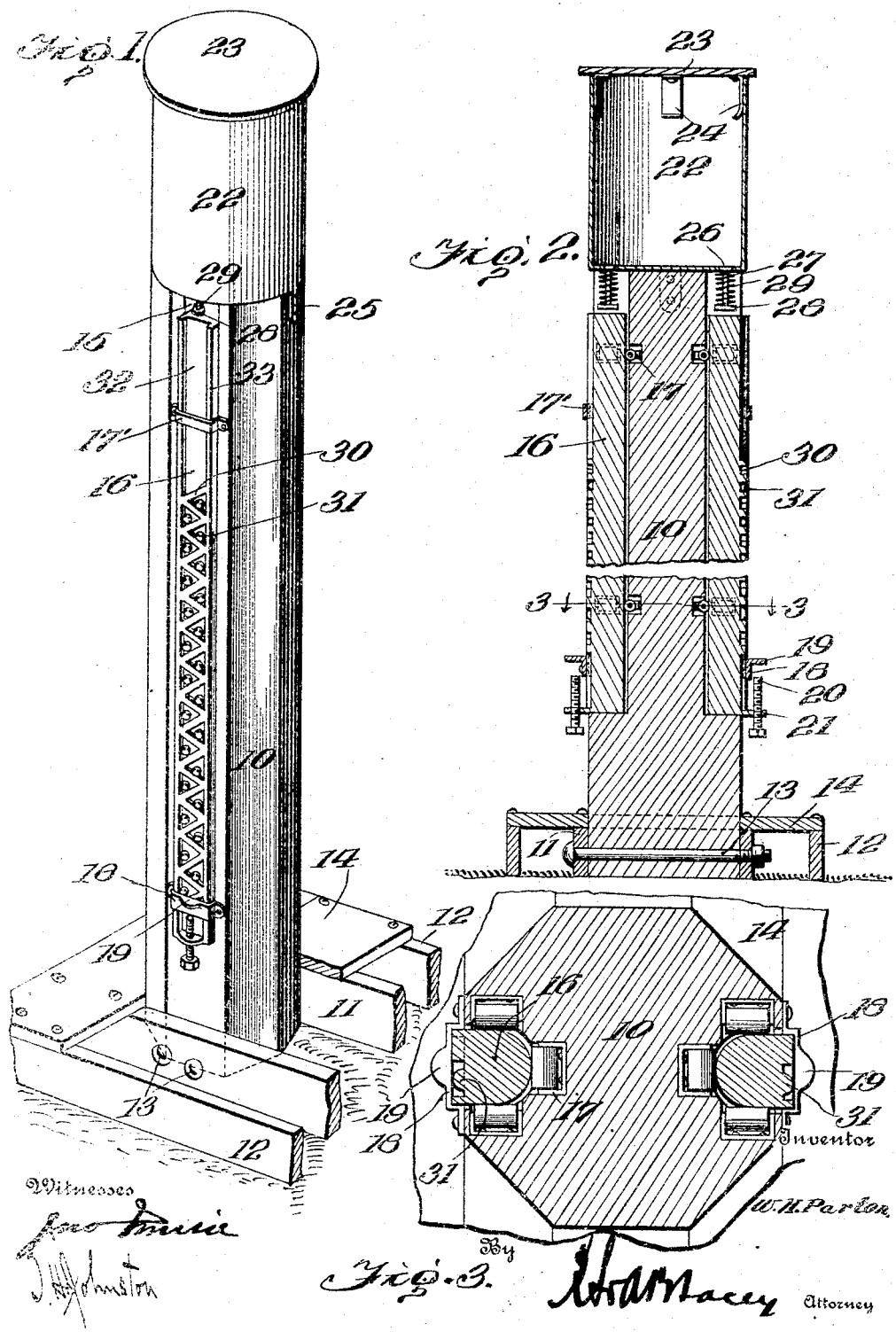
W. H. PARTON.
RUBBING POST.
APPLICATION FILED OCT. 1, 1914.
1,198,570. Patented Sept. 19, 1916.

WILLIAM H. PARTON, OF LINCOLN, NEBRASKA, ASSIGNOR OF ONE-HALF TO LOUIS J. GREGERSON AND ONE-HALF TO G. PETER GREGERSON, BOTH OF LINCOLN, NEBRASKA.

RUBBING-POST.

1,198,570.  Specification of Letters Patent.  Patented Sept. 19, 1916.

Application filed October 1, 1914. Serial No. 864,442.

*To all whom it may concern:*

Be it known that I, WILLIAM H. PARTON, citizen of the United States, residing at Lincoln, in the county of Lancaster and State of Nebraska, have invented certain new and useful Improvements in Rubbing-Posts of which the following is a specification.

This invention relates to certain new and useful improvements in rubbing posts for cattle, hogs, or the like, and has as its primary object to provide an improved device of this character wherein an animal in rubbing against the post may automatically effect the release of an insecticide or disinfectant which will then be communicated to the animal by a suitable combined rubbing and distributing element.

The invention has as a further object to provide an improved rubbing post, wherein the flow of insecticide or disinfectant will be normally shut off, and wherein the action of animals in rubbing against the rubbing elements employed will serve to actuate said rubbing elements to effect the actuation of suitable means disposed to permit the said disinfectant or insecticide to be discharged upon the said rubbing elements to be thence communicated to the said animals.

A still further object of the invention is to provide a device of this character wherein the throw of the rubbing elements employed may be adjusted so that a relatively large or small amount of insecticide may be allowed to escape upon said rubbing elements at each actuation thereof. And the invention has as a still further object to provide a rubbing post wherein the rubbing elements employed will, by gravity, retain their normal position so that the device will be entirely automatic in discharging insecticide, and wherein the construction employed will be exceedingly simple, durable, and effective in operation.

With these and other objects in view, my invention will be more fully described, illustrated in the accompanying drawings and then specifically pointed out in the claims which are attached to and form a part of this application.

In the drawings:—Figure 1 is a perspective view of my improved post, Fig. 2 is a vertical sectional view particularly illustrating the arrangement of the valves closing the receptacle disposed to receive an insecticide, as well as the arrangement of the combined rubbing and insecticide distributing elements, with relation to the valves, and Fig. 3 is a transverse sectional view showing the mounting of the said rubbing and insecticide distributing elements.

Corresponding and like parts are referred to in the following description and indicated in all the views of the drawing by the same reference characters.

Referring more particularly to the drawings, the numeral 10 designates the body portion of my improved post which is preferably formed of wood and which, of course, may be of any desired cross-sectional configuration, size or height, although, as illustrated in the drawings, the said post is preferably provided with flat side faces.

Secured to the post 10, at one extremity thereof, is a base 11 which preferably includes sleepers 12, the sleepers bearing against the adjacent faces of the post upon opposite sides thereof, being secured to the post by suitable bolts or other fastening means 13. Arranged upon the sleepers 12 are suitable members or planks 14 and a platform is thus provided which is adapted to support the post 10 in an upright position and upon which animals may walk to rub against the post.

Formed in the post 10 upon opposite sides thereof, are longitudinally extending recesses or channels 15 which open upon the upper extremity of the post, and arranged in said channels are combined distributing and rubbing elements 16. As shown in Figs. 1 and 2 of the drawing, the members 16 are of less length than the channels 15 and are mounted for vertical sliding movement within said channels, the said members being engaged by suitable anti-friction rollers 17 seated within the channels 15 adjacent opposite extremities thereof.

As best shown in Fig. 3 of the drawings, the anti-friction rollers 17 are arranged to engage the side faces of the members 16, while one of said rollers is arranged in the rear of each of said members, adjacent each end thereof, so that when an animal rubs against the members 16, the said members will freely move vertically within the channels 15.

The members 16 are preferably formed of suitable metal and may be of any desired cross-sectional configuration, and are so mounted within the channels 15 as to project laterally beyond the adjacent side faces of the post 10, the said members normally resting against the bottom walls of said channels by which they are supported.

Extending over the channels 15 adjacent opposite extremities thereof, are transversely extending brackets or guides 17 and 18 which are disposed to maintain the members 16 in position within the channels 15. The brackets 18, intermediate the ends thereof, are provided with laterally extending lips or lugs 19 which are disposed for engagement by set screws 20 which extend vertically through suitable lugs 21 formed on the members 16 adjacent the lower terminals thereof. As will be clear, by adjusting the set screws 20 toward or away from the lugs 19, the throw or upward vertical movement of the members 16 may be regulated. The purpose of this adjustment will presently appear.

Arranged upon the upper terminal of the post 10 is a receptacle 22 which is disposed to receive a suitable disinfectant or insecticide and to which is detachably connected a closure 23, the said closure being provided with resilient fingers 24 disposed to engage the inner walls of the receptacle for maintaining the closure in position thereon. Upon opposite sides, the receptacle 22 is provided with longitudinally extending lugs 25 which are disposed to bear against the faces of the post upon opposite sides thereof, the said lugs being secured to the post in any suitable manner for maintaining the receptacle in position thereon.

Formed in the bottom wall of the receptacle 22 adjacent opposite sides thereof, are suitable openings which provide valve seats disposed to receive valves 26, the said valves being provided with stems 27 arranged exteriorly of the receptacle 22, which stems are provided with terminal heads 28.

Surrounding the stems 27 of the valves 26 and interposed between the bottom wall of the receptacle and the heads 28 of the valves, are helical springs 29 which are disposed to normally maintain the valves 26 seated to thus normally close the receptacle.

As shown in Figs. 1 and 2 of the drawings, the valve stems 27 are arranged to project longitudinally within the recesses 15 in the path of the members 16 so that when either of said members is moved upwardly by the rubbing action of an animal, it will engage the head 28 of the adjacent valve to force said valve upwardly whence, as will be clear, the insecticide contained within the receptacle 22 will be allowed to escape and will normally follow the adjacent valve stem 27 to flow upon the contiguous member 16 to be then communicated to the animal rubbing against the said member.

The purpose of the set screws 20 will therefore, now be clear, since, by adjusting said screws, the throw of the members 16 may be regulated so that when moved upwardly, the valves 26 may be entirely unseated or may be partially unseated as desired to permit either a relatively large amount of insecticide to escape from the receptacle 22 or a correspondingly small amount. The members 16 will, by gravity, maintain their normal positions seated against the bottom walls of the recesses 15 and thus, as soon as the animal ceases to rub against either member 16 to release the said member, the said members will return to normal position when the springs 17 will close the valves 26 to thus shut off the flow of the insecticide. However, so long as the animal maintains either of the members 16 moved upwardly into engagement with the adjacent valve stem 27, the insecticide will continue to flow upon the said member to be communicated to the animal. The construction which I provide is consequently, automatic in its action and it is to be noted that the insecticide cannot be wasted, since it will only be allowed to escape from the receptacle 22 when an animal properly actuates either of the members 16.

The outer faces of the members 16 which are disposed to contact with animals rubbing against the post, are preferably provided with some suitable rough surface and may, as illustrated in the drawings, each be formed with a substantially sinuous and longitudinally extending rib 30 between the bends of which are provided pins or studs 31. The ribs 30 and studs 31 of each member 16 are preferably arranged within a suitable channel 32 formed in the outer face of each of said members, so that the side walls 33 of said channels will direct the insecticide flowing from the valve stems 27 over the ribs 30 and the studs 31 to come in contact with animals rubbing against the said members. The insecticide upon entering the channels 32 will normally follow the ribs 30 to be thus distributed laterally over the outer faces of the members 16 and owing to the longitudinal disposition of the said ribs, will be quickly distributed throughout the greater portion of the length of the said members, the ribs as well as the studs 31, being necessary or desirable, only throughout a portion of the length of the members 16 or the portion thereof which will actually come in contact with animals rubbing against the said members.

While I have illustrated the members 16 as being provided with channels 32 in which are arranged the ribs 30 and studs 31, still, it is to be understood that I do not wish to be limited to this construction since, the insecticide discharged from the receptacle 22 will still be communicated to an animal rubbing against either of the members 16 by said members, were the specific construction of the members 16 which I have illustrated, to be varied. Moreover, while I have illustrated the members as being engaged by anti-friction rollers 17, it will also be understood that the said members could be otherwise mounted for free vertical movement.

It will therefore be seen that I provide a very simple and efficient construction for the purpose set forth which is adapted to be automatically operated by an animal rubbing against the post and coming in contact with the rubbing elements, and wherein the actuation of the said elements upwardly, will cause an insecticide to be discharged upon the rubbing elements to be thence communicated to the animal. It will further be seen that upon the release of the rubbing elements by the animal, the flow of insecticide will be automatically shut off and that the throw of the said rubbing elements may be adjusted to regulate the discharge of insecticide from the receptacle.

Having thus described my invention, what I claim and desire to secure by Letters Patent is:—

1. A device of the character described including a support, a rubbing element slidably mounted thereon, a guide for said element, means carried by said element and disposed to engage said guide, said means being adjustable either toward or away from the guide to regulate the sliding movement of said element in one direction, a receptacle mounted upon the support and adapted to contain a liquid, and a valve normally closing said receptacle, said valve being arranged in the path of said element and said element being movable to open the valve to permit the discharge of the liquid upon the said element.

2. A device of the character described including a support, a rubbing element slidably mounted thereon, a guide for said element, said guide being formed with a lug, a set screw carried by said element and disposed to engage said lug, said set screw being adjustable either toward or away from the lug to regulate the movement of said element in one direction, a receptacle mounted upon the support and adapted to contain a liquid, and a valve normally closing said receptacle, said rubbing element being adapted for movement to open said valve to permit the discharge of the liquid upon the said element.

3. A device of the character described including a support, a rubbing element slidably mounted thereon, said rubbing element having a channel formed in one side face thereof, a sinuous rib formed in said channel and arranged longitudinally thereof, studs formed on said element and disposed between the bends of said rib, a receptacle mounted upon the support and adapted to contain a liquid, and a valve normally closing said receptacle and arranged in the path of said element, said element being adapted for movement to open said valve to permit the discharge of the liquid from the receptacle within said channel and upon said rib and studs.

4. A device of the character described including a support channeled to receive a rubbing element, anti-friction rollers arranged in said channel, a rubbing element slidably mounted in said channel and engaged by said rollers, a receptacle mounted upon the support and adapted to contain a liquid, and a valve normally closing said receptacle, said valve being provided with a stem projecting in said channel in the path of said element, the said element being adapted for movement to engage said stem to open the valve and permit the discharge of the liquid upon the said element.

In testimony whereof I affix my signature in presence of two witnesses.

WILLIAM H. PARTON. [L. S.]

Witnesses:
 W. D. WILSON,
 J. WAGONER.

Copies of this patent may be obtained for five cents each, by addressing the "Commissioner of Patents, Washington, D. C."